US012602379B2

(12) United States Patent
Jacob et al.

(10) Patent No.: US 12,602,379 B2
(45) Date of Patent: Apr. 14, 2026

(54) OPTIMIZING DATABASE CURSOR OPERATIONS IN KEY-VALUE STORES

(71) Applicant: MICRON TECHNOLOGY, INC., Boise, ID (US)

(72) Inventors: Jacob Mulamootil Jacob, Cedar Park, TX (US); Gaurav Sanjay Ramdasi, Austin, TX (US); Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/497,145

(22) Filed: Oct. 30, 2023

(65) Prior Publication Data

US 2024/0143585 A1 May 2, 2024

Related U.S. Application Data

(60) Provisional application No. 63/421,086, filed on Oct. 31, 2022.

(51) Int. Cl.
| | |
|---|---|
| *G06F 16/2453* | (2019.01) |
| *G06F 16/215* | (2019.01) |
| *G06F 16/2455* | (2019.01) |

(52) U.S. Cl.
CPC ........ *G06F 16/2453* (2019.01); *G06F 16/215* (2019.01); *G06F 16/24562* (2019.01)

(58) Field of Classification Search
CPC ........... G06F 16/2453; G06F 16/24562; G06F 16/215; G06F 16/248; G06F 16/2445; G06F 11/1451; G06F 12/0868; G06F 16/532; G06F 16/27; G06F 16/245; G06F 16/217

USPC .......................................................... 707/713
See application file for complete search history.

(56) References Cited

U.S. PATENT DOCUMENTS

| | | | | |
|---|---|---|---|---|
| 10,769,064 | B1 * | 9/2020 | Twitto ................. | G06F 12/0692 |
| 2011/0246503 | A1 * | 10/2011 | Bender .................. | G06F 9/546 |
| | | | | 707/769 |
| 2017/0351543 | A1 * | 12/2017 | Kimura .............. | G06F 16/2365 |
| 2019/0065621 | A1 * | 2/2019 | Boles ................. | G06F 16/9027 |
| 2020/0117744 | A1 * | 4/2020 | Tomlinson .......... | G06F 16/2246 |
| 2020/0174934 | A1 * | 6/2020 | Zaydman ............ | G06F 16/9014 |
| 2020/0192590 | A1 * | 6/2020 | Kurichiyath ......... | G06F 3/0679 |
| 2020/0192940 | A1 * | 6/2020 | Tomlinson .......... | G06F 16/9027 |
| 2021/0200818 | A1 * | 7/2021 | Premsankar ........... | G06F 16/14 |
| 2021/0216448 | A1 * | 7/2021 | Chen ..................... | G06F 3/0679 |
| 2021/0318986 | A1 * | 10/2021 | Jacob .................. | G06F 16/1734 |
| 2022/0043585 | A1 * | 2/2022 | Senyuk .................. | G06F 16/27 |
| 2022/0382651 | A1 * | 12/2022 | Lu ........................ | G06F 11/1471 |
| 2024/0126738 | A1 * | 4/2024 | Bhola ................ | G06F 16/2282 |

* cited by examiner

*Primary Examiner* — Evan Aspinwall
(74) *Attorney, Agent, or Firm* — Lowenstein Sandler LLP

(57) ABSTRACT

A system includes a memory device a processing device, operatively coupled to the memory device. The processing device is configured to receive a request to identify a target key in a key-value store based on a specified key; identify, in at least one of a plurality of sequences of memory keys, the target key based on the specified key, where the plurality of sequences of memory keys includes a sequence of memory keys and a sequence of media keys that comprises designated media keys, where each of the designated media keys is designated as being deleted, where the identifying comprises comparing each of the designated media keys to the specified key; and perform a database operation using the target key.

17 Claims, 9 Drawing Sheets

150

Perform Application Cursor Setup Operation that advances
media key pointer past consecutive tombstones
200B

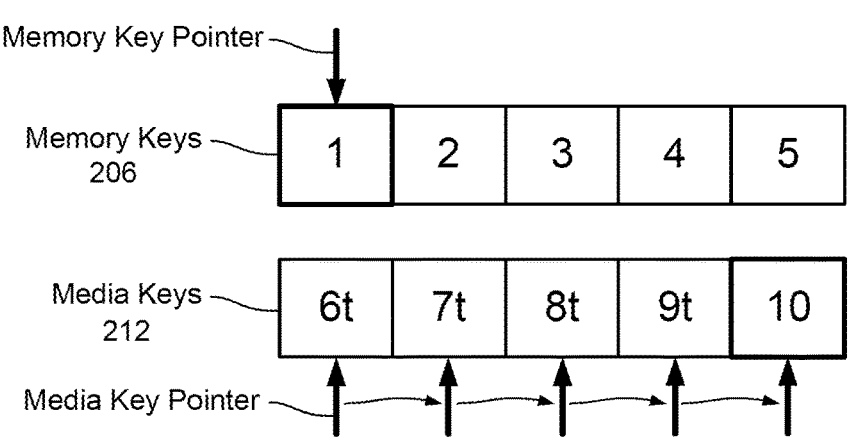

Resulting current memory key = 1
Resulting current media key = 10
Resulting cursor positon = 1 (minimum of 1 and 10)

FIG. 2B

After deleting key 1, perform another Application Cursor Setup Operation,
which again advances media key cursor past consecutive tombstones
200C

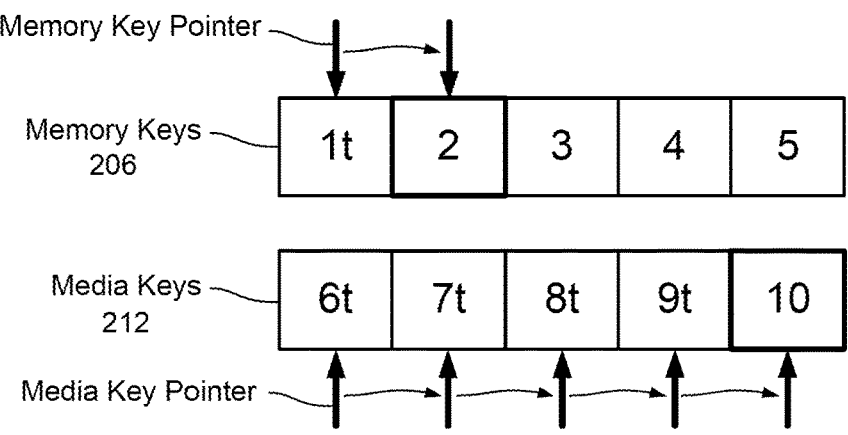

Resulting current memory key = 2
Resulting current media key = 10
Resulting cursor positon = 2 (minimum of 2 and 10)

FIG. 2C

Perform Application Cursor Setup Operation that does
not advance past tombstones
200D

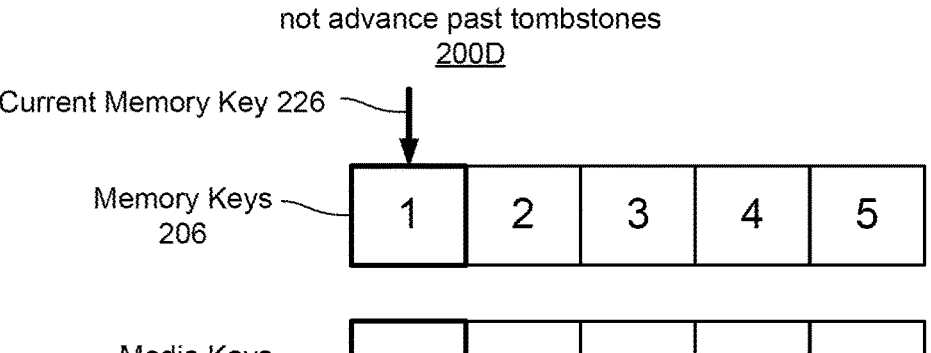

Resulting current memory key = 1
Resulting current media key = 6t
Resulting cursor positon = 1 (minimum of 1 and 6 and not a tombstone)

FIG. 2D

After deleting key 1, perform Application Cursor Operation that
does not advance past tombstones
200E

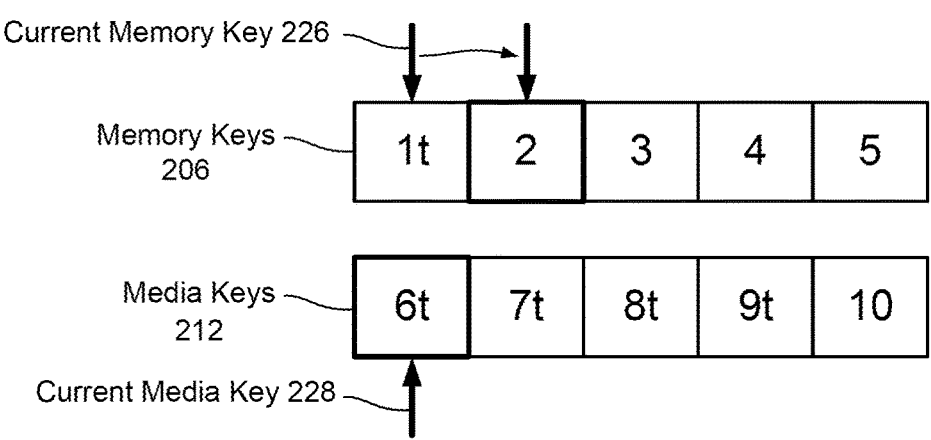

Resulting current memory key = 2
Resulting current media key = 6t
Resulting cursor positon = 2 (minimum of 2 and 6 and not a tombstone)

FIG. 2E

Perform Application Cursor Seek Operation to specified key=6
<u>200F</u>

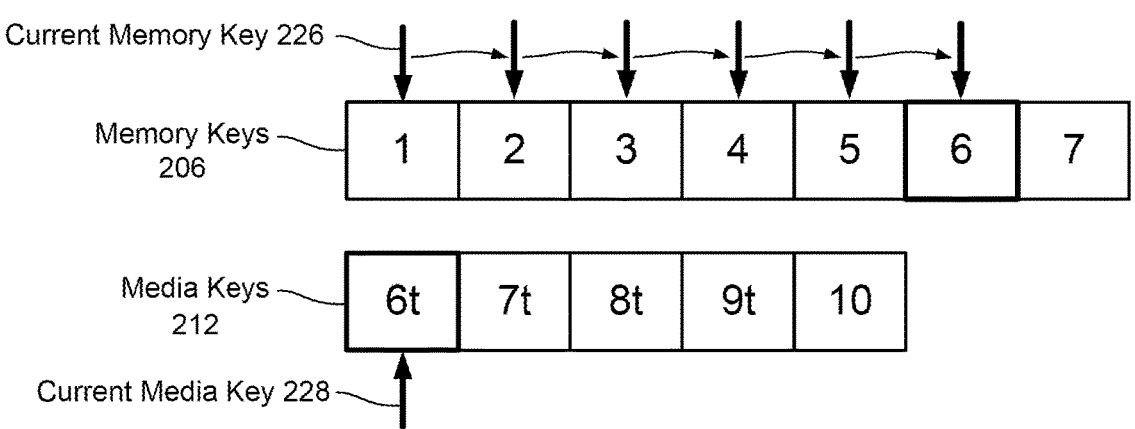

Current Memory Key 226

Memory Keys 206

Media Keys 212

Current Media Key 228

Resulting current memory key = 6
Resulting current media key = 6t
Resulting cursor positon = 6 (memory keys take precedence over media keys because any memory key is newer than any media key)

FIG. 2F

Perform Application Cursor Seek Operation to specified key=8
<u>200G</u>

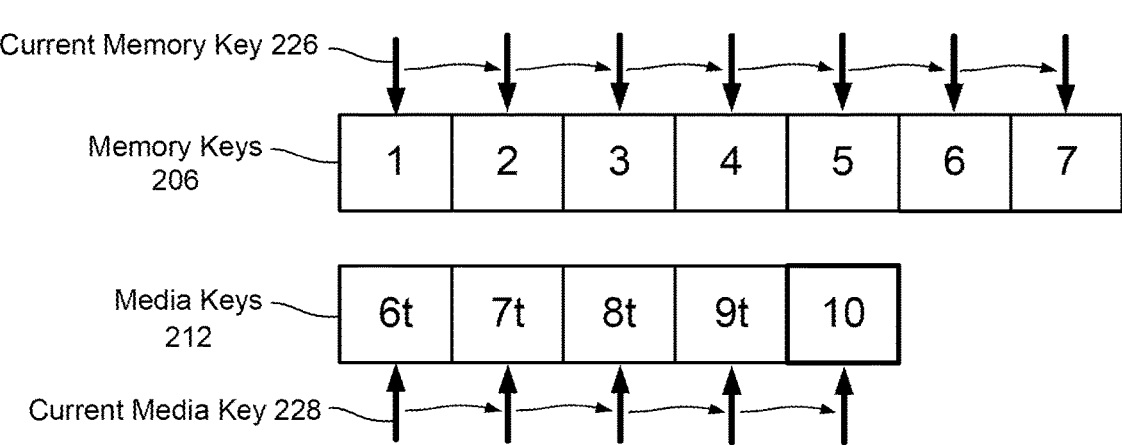

Current Memory Key 226

Memory Keys 206

Media Keys 212

Current Media Key 228

Resulting current memory key = not found
Resulting current media key = 10 (smallest media key >= target key and not a tombstone)
Resulting cursor positon = 10

FIG. 2G

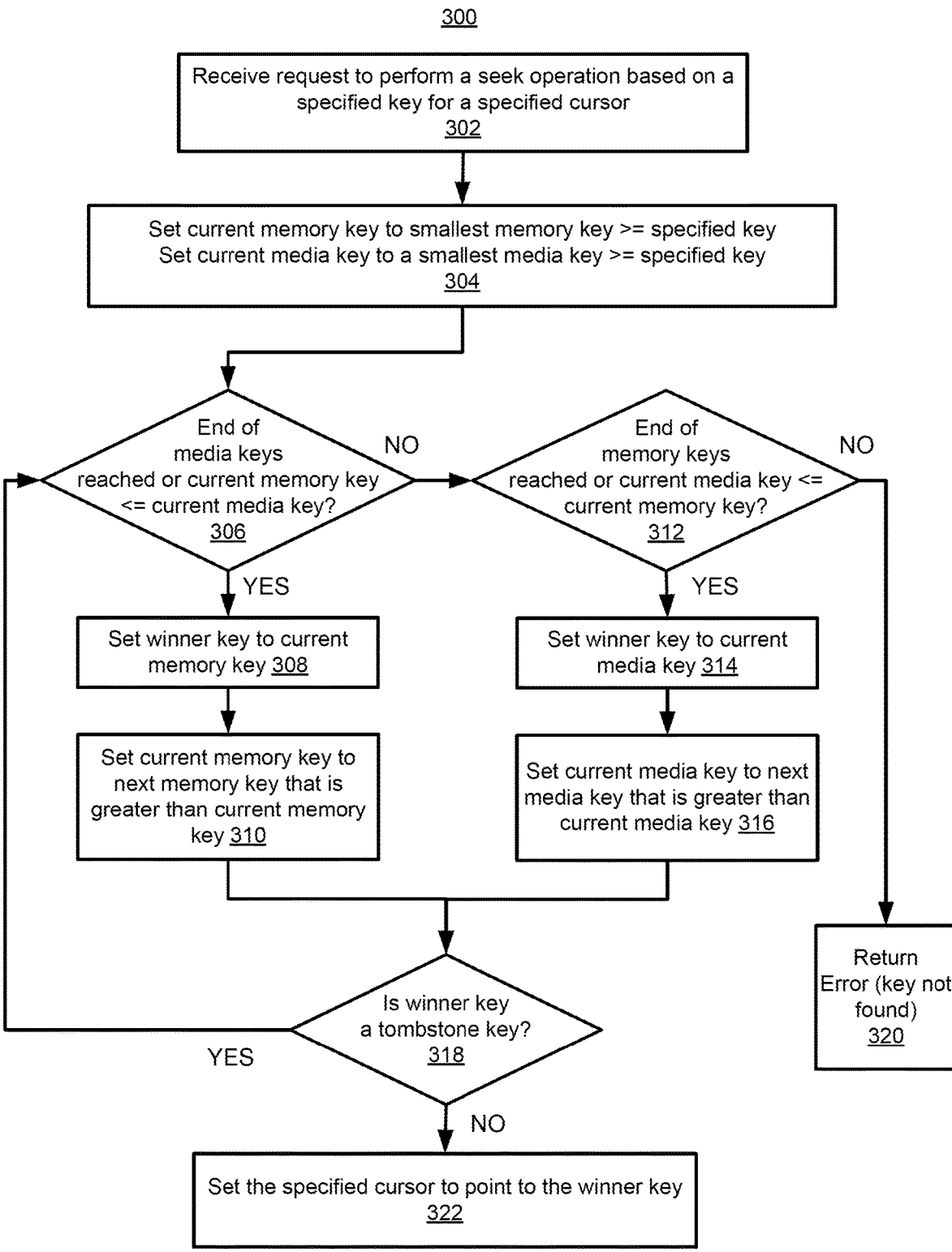

300

Receive request to perform a seek operation based on a
specified key for a specified cursor
302

Set current memory key to smallest memory key >= specified key
Set current media key to a smallest media key >= specified key
304

End of
media keys
reached or current memory key
<= current media key?
306
NO

End of
memory keys
reached or current media key <=
current memory key?
312
NO

YES

Set winner key to current
memory key 308

Set current memory key to
next memory key that is
greater than current memory
key 310

YES

Set winner key to current
media key 314

Set current media key to next
media key that is greater than
current media key 316

Return
Error (key not
found)
320

Is winner key
a tombstone key?
318

YES

NO

Set the specified cursor to point to the winner key
322

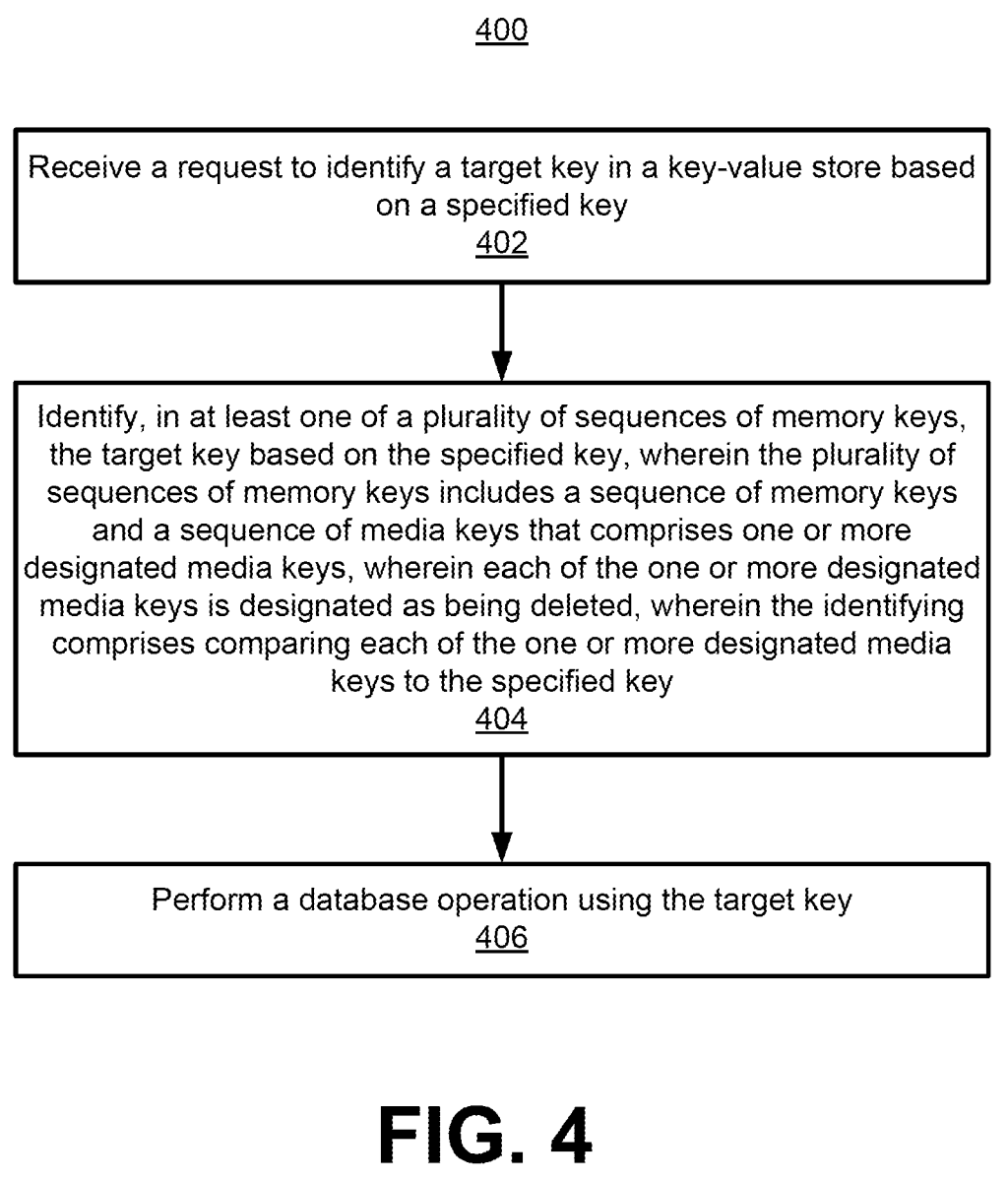

Receive a request to identify a target key in a key-value store based on a specified key
402

Identify, in at least one of a plurality of sequences of memory keys, the target key based on the specified key, wherein the plurality of sequences of memory keys includes a sequence of memory keys and a sequence of media keys that comprises one or more designated media keys, wherein each of the one or more designated media keys is designated as being deleted, wherein the identifying comprises comparing each of the one or more designated media keys to the specified key
404

Perform a database operation using the target key
406

FIG. 4

OPTIMIZING DATABASE CURSOR OPERATIONS IN KEY-VALUE STORES

REFERENCE TO RELATED APPLICATIONS

This application claims the priority benefit of U.S. Provisional Application No. 63/421,086, filed Oct. 31, 2022, which is incorporated by reference herein.

TECHNICAL FIELD

Embodiments of the disclosure relate generally to memory sub-systems, and more specifically, relate to optimizing database cursor operations in key-value stores.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

FIGS. 2B and 2C illustrate example cursor setup operations that advance a media key pointer past one or more tombstone media keys.

FIGS. 2D and 2E illustrate example cursor setup operations that compare each tombstone media key to a memory key prior to advancing the cursor past the tombstone media key in accordance with some embodiments.

FIG. 2F illustrates an example cursor seek operation that seeks to a specified key identifier that is present in both a sequence of memory keys and a sequence of media keys in accordance with some embodiments.

FIG. 2G illustrates an example cursor seek operation that seeks to a specified key identifier that is present in a sequence of media keys in accordance with some embodiments.

FIG. 3 is a flow diagram of an example method to perform a seek operation based on a specified key identifier in a key-value store in accordance with some embodiments.

FIG. 4 is a flow diagram of an example method to identify a target key based on a specified key and perform a database operation using the identified target key in accordance with some embodiments.

DETAILED DESCRIPTION

Figure 1A:
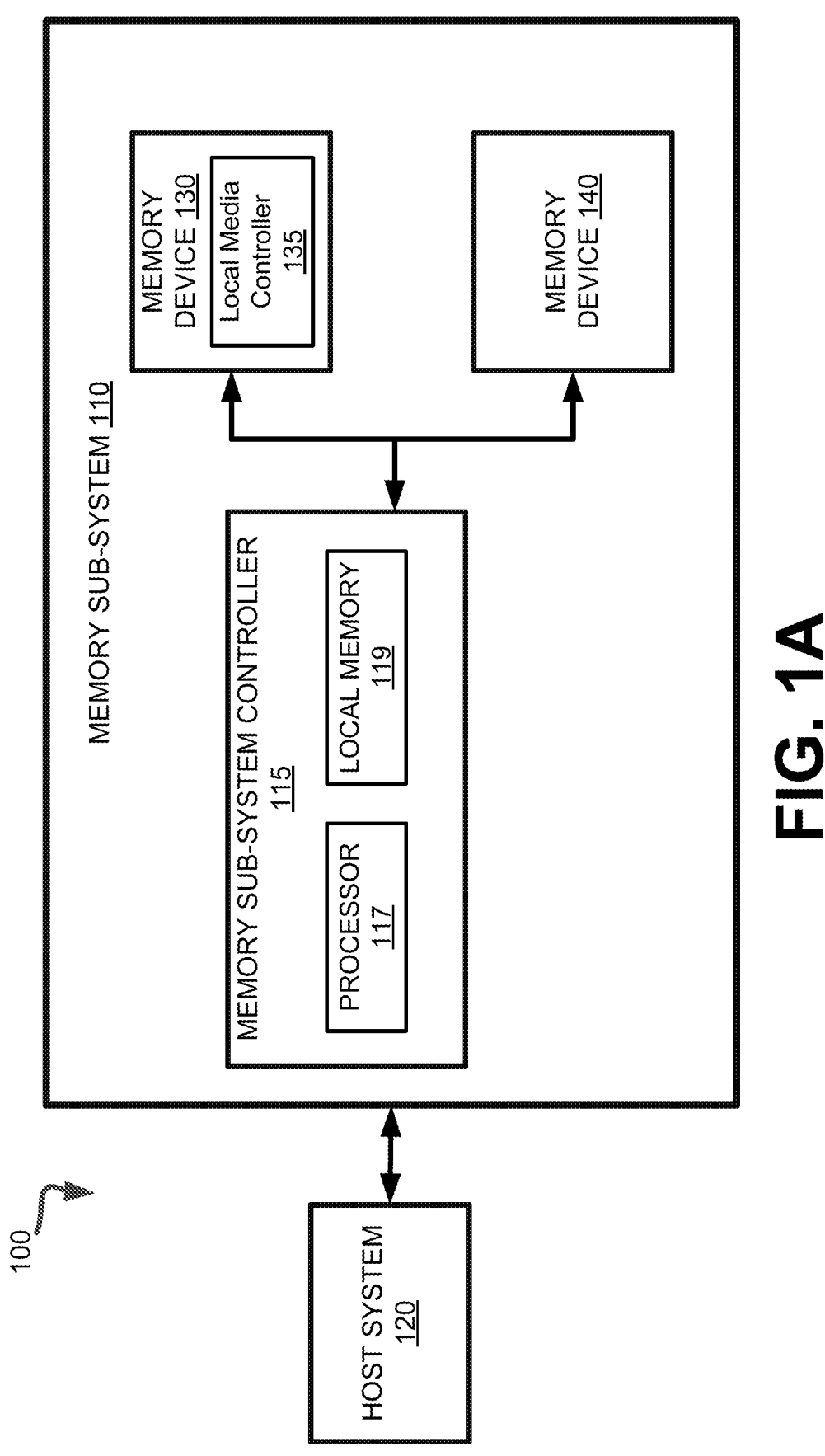
FIG. 1A illustrates an example computing system that includes a memory sub-system in accordance with some embodiments of the present disclosure.

Aspects of the present disclosure are directed to optimizing database cursor operations in key-value stores. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies. Each die can include two or more planes. For some types of non-volatile memory devices (e.g., NAND devices), each plane includes of a set of physical blocks. In some implementations, each block can include multiple sub-blocks. Each plane carries a matrix of memory cells formed onto a silicon wafer and joined by conductors referred to as wordlines and bitlines, such that a wordline joins multiple memory cells forming a row of the matrix of memory cells, while a bitline joins multiple memory cells forming a column of the matrix of memory cells.

Depending on the cell type, each memory cell can store one or more bits of binary information, and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

A storage engine can provide a key-value database, which can store information in the form of key-value pairs. The key-value database can include one or more key-value stores ("KV stores"). Each KV store can include one or more key-value pairs. Each key-value pair includes a key and an associated data item (referred to as "value"). The key can be used to efficiently identify the value in data access operations, such as queries. The key-value database can provide data access operations such as a store operation, which stores a specified key-value pair in a KV store, and a read operation, which retrieves a value associated with a specified key.

The key-value database can maintain one or more cursors, which can simplify and/or improve the efficiency of certain data access operations. "Cursor" herein shall refer to a pointer to a particular key in the KV store, or a data structure that contains such a pointer. Thus, a cursor can "point to" the key of a particular key-value pair. A setup operation can be performed on each cursor to initialize the cursor to a particular state. For example, the setup operation can set the cursor's pointer to point to the first key in a sequence of keys. The setup operation can be performed prior to performing other operations with the cursor, such as the seek operation described below. The setup operation can also be performed at other times, e.g., if a change in state in the database causes the cursor to potentially become invalid. A seek operation can cause a specified cursor to point to a specified key. Subsequent to performing a seek operation using a specified cursor for a specified key, a read operation can be performed using the specified cursor to retrieve the value associated with the key to which the cursor points (e.g., the specified key).

Each key-value pair in the key-value database can be stored in volatile memory, such as Random Access Memory (RAM), or non-volatile persistent storage media, such as a flash memory, storage-class memory, or other persistent storage media. Storage-class memory can be a combination of dynamic RAM (DRAM), flash memory, and a power source that provides data persistence, for example. Volatile memory is referred to herein as "memory" and non-volatile persistent storage media is referred to as "media" herein for brevity.

The storage engine can divide the set of key-value pairs into a memory-resident subset that is stored in memory, and a media-resident subset that is stored on persistent media. The memory-resident subset can include most recently added key-value pairs, and the media-resident subset can include the remaining key-value pairs. The keys in the memory-resident set of key-value pairs can be represented as an ordered (e.g., lexicographically) sequence of memory keys. Further, the keys in the media-resident set of key-value pairs can be represented as an ordered (e.g., lexicographically) sequence of media keys. Since there are two different sequences of keys, operations that access particular keys, such as a cursor seek operation, can search both sequences of keys for a specified key. Searching the sequences efficiently for a specified key can involve iterating through at least a portion of the elements in each sequence, and comparing a key from the sequence of memory-resident keys to a key in the sequence of media-resident keys. The search can advance to the next key in one of the sequences based on a result of the comparison, and repeat the comparing and advancing until a key equal to or greater than the specified key is found. However, the sequences can contain deletion markers ("tombstones") that identify deleted key-value pairs. A tombstone can occur at any location in a sequence, and are often preceded and/or followed in the sequence by valid (i.e., non-tombstone) keys. A tombstone, together with the associated value, can eventually be deleted by a garbage collection process, but a substantial number of tombstones can accumulate in each key sequence prior to a garbage collection operation.

One possible technique for searching the sequences of keys that contain tombstones is to discard tombstones in at least one of the sequences during the search. For example, when a key is to be retrieved from the sequence of media-resident items, the storage engine can iterate through consecutive tombstones in one of the sequences (e.g. the media key sequence) until a valid (non-tombstone) key is reached. In this iteration technique, each tombstone can be bypassed in a relatively small amount of time. Since each key can be associated with information indicating whether the key is a tombstone, the iteration technique can efficiently determine whether each key is a tombstone, and if so, advance to the next key in the sequence. The iteration technique can advance past numerous consecutive tombstones by repeatedly advancing and discarding tombstones in one of the sequences until a valid (non-tombstone) key is reached. Upon reaching a valid key, the search process described above can continue, e.g., by comparing the valid key to a key in the other sequence (e.g., the memory key sequence).

However, the technique of advancing past consecutive tombstones until a non-tombstone is found can substantially reduce the storage engine's performance for certain database operations, such as operations that cause cursor setup to be performed frequently. As described above, the cursor setup operation can initialize the cursor to point to an initial key. In certain storage engines, the cursor setup operation uses the technique of advancing past consecutive tombstones until a non-tombstone is found. However, if one of the key sequences, e.g., the media key sequence, contains a large number of consecutive tombstones starting at the beginning of the sequence, then the cursor setup operation advances past the consecutive tombstones until a non-tombstone key is found. In one example, a range delete operation, which deletes key-value pairs having key identifiers in a specified range (e.g., 1-50000), can create a cursor for each key in the range. If there are numerous tombstones, as can occur after deleting thousands of key-value pairs, iterating through consecutive tombstones until a non-tombstone is found can involve iterating past thousands or millions of keys, and can take more than 1 second.

Thus, although the latency of advancing past each tombstone key is small, the latency of advancing past a sequence of a large number of consecutive tombstone keys can be quite high. Each cursor setup operation can take more than 1 second, and numerous cursor setup operations can be performed in a range delete. This cursor setup latency can cause range deletes on databases that are partitioned across servers (e.g., using sharding techniques), to become performance bottlenecks. A cursor manager can detect that the cursor operation has not completed after a time period (e.g., 1 second), and request another cursor setup operation. In one example, the repeated cursor setup operations can reduce the range delete throughput to less than one key deletion per second.

Aspects of the present disclosure address the above and other deficiencies by using a key sequence searching technique that in some embodiments searches for a specified key in both the sequence of memory keys and the sequence of media keys, starting at the smallest key in each sequence that is greater than or equal to the specified key. Thus, the searching technique initializes a memory key as the smallest key in the memory sequence greater than or equal to the specified key and further initializes a media key to be the smallest key in the media sequence greater than or equal to the specified key. The search technique then performs a merging operation based on the memory key (in the sequence of memory keys) and the media key (in the sequence of media keys). The merging operation compares the memory key to the media key, selecting the memory key if the memory key is less than or equal to the media key, or selecting the media key if the media key is less than the memory key, and advancing to the next key in the sequence that contains the selected key. If the selected key is a tombstone, the merging operation is then repeated. If the selected key is not a tombstone, then the selected key is the result of the search, referred to herein as the result key. The result key is, therefore, the smallest of the keys in the memory and media sequences that is equal to or greater than the specified key for which the search was performed. If the result key is greater than the specified key, then the specified key does not exist in the database. In other cases, e.g., the sequences do not contain a valid (non-tombstone) key greater than or equal to the specified key, the result of the search can indicate that no key was found. If the result matches the specified key, or the result key does not match the specified key but is acceptable to the application (e.g., client application or storage engine component) that invoked the search, then the result key can be used to perform a database operation.

For example, the search described above can be performed by a seek operation that seeks to a specified key. The search can return a key item data structure associated with the result key, and the key item can identify a value associated with the key. Alternatively, the sequences can be sequences of key items, and each key item can contain a key and a value. The result of the search can then be a key item that contains the result key and references a value associated with the result key. The seek operation can then create a cursor that references the key item, and provide the cursor to the application that invoked the seek operation. The application can provide the cursor as input to a read operation, which can return the value that is referenced by the key item to the application.

Advantages of the present disclosure include, but are not limited to, substantially improved performance of database operations such as range deletes. In many cases, the search finds the result key without advancing through an entire sequence of tombstones. For example, the sequence of memory keys often contains a non-tombstone key that is less than the largest tombstone media key in the sequence of media keys. In that case, the search can stop advancing through tombstones in the sequence of media keys prior to reaching the end of the consecutive tombstones. The search stops advancing through tombstones in the sequence of media keys if a non-tombstone memory key is found in the sequence of memory keys, and the non-tombstone memory key is less than or equal to the media key to which the memory key is compared, even if the media key is a tombstone. Since in many cases the search finds a result in the sequence of memory keys without advancing through an entire sequence of consecutive tombstones, operations that involve searching for keys, can be performed quickly (e.g., in much less than 1 second), and the search or other operations that access the sequence of memory keys and the sequence of media keys can be performed without substantially degrading performance of the storage engine. Accordingly, operations that perform many cursor setup operations, such as the range delete operation, can be performed without substantially degrading performance. Further, since the cursor operations complete quickly, additional unnecessary cursor operations are not requested by the database manager.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (Mus).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

Figure 1B:
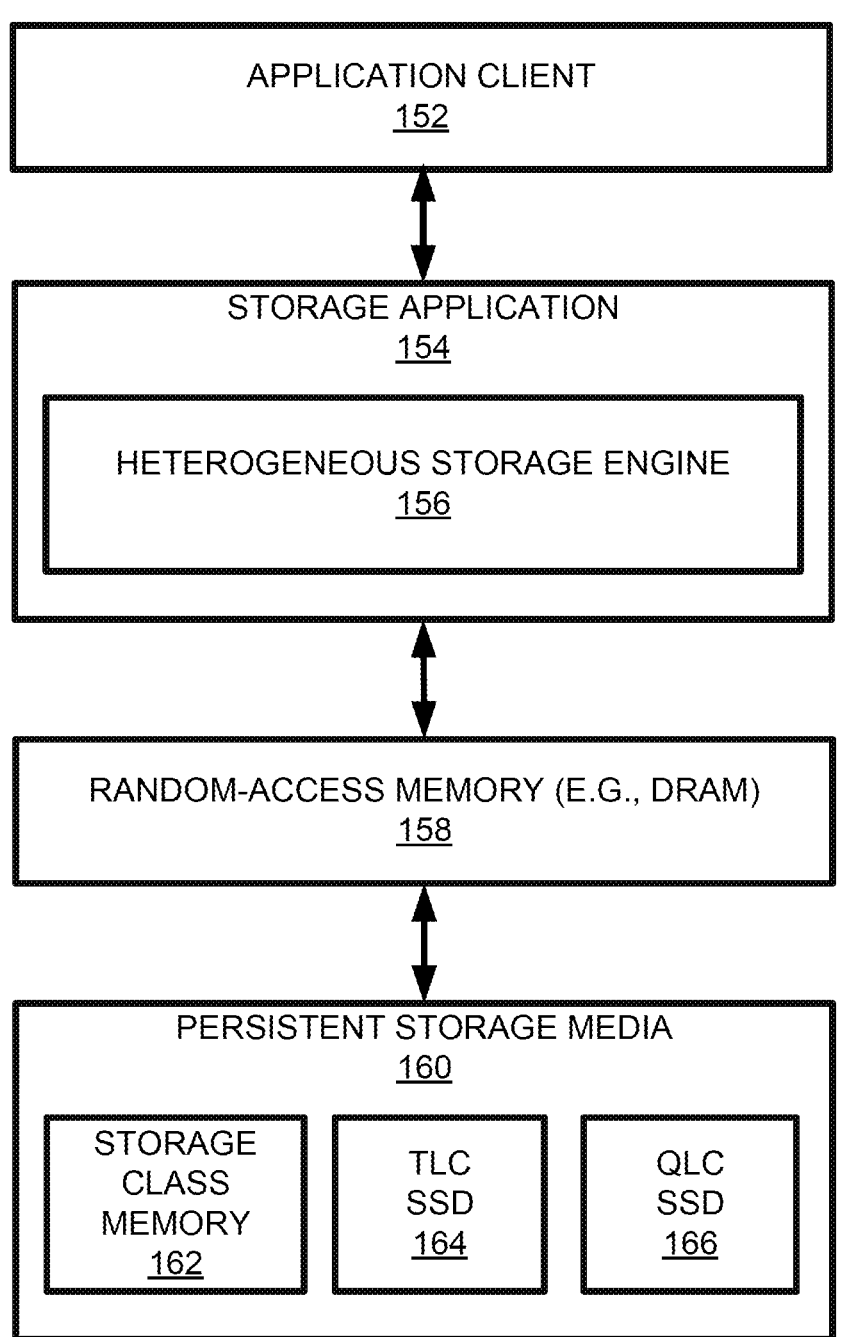
FIG. 1B illustrates an example computing environment that includes a storage engine in accordance with some embodiments of the present disclosure.

FIG. 1B illustrates an example computing environment 150 that includes a storage engine 156 in accordance with some embodiments of the present disclosure. An application client 152 can store and retrieve data in a storage application 154. In some embodiments, the storage application 154 can be a key-value database or other non-relational database. In other embodiments, the storage application 154 can be a relational database, and object store, or other data storage application. The data can include key-value pairs stored in one or more key-value stores provided by the storage application 154. The application client 152 can invoke one or more data access operations provided by the storage application 154. The application client 152 can be an interface between a user and the storage application 154. The storage application 154 can use a heterogeneous memory storage engine (HSE) 156, which can store, read, update, and delete data on one or more underlying devices such as random-access memory 158 and/or flash memory devices. For example, the heterogeneous memory storage engine 156 can store key-value pairs of one or more key-value stores in random-access memory 158 (e.g., Dynamic RAM) and on one or more types of storage media 160. The storage media 160 can include storage class memory 162, a triple-level cell (TLC) flash memory-based SSD 164, and/or quad-level cell (QLC) flash memory-based SSD 166, for example. The HSE 156 can be optimized for accessing data stored persistently in flash memory and/or storage class memory, and can manage multiple classes of storage. The heterogeneous memory storage engine 156 can access the storage media 160 via an interface such as NVMe or PCIe. The application client 152, the storage application 154, and/or the heterogeneous memory storage engine 156 can be located on the host system 120 of FIG. 1A. The random-access memory 158 can be the memory device 150, and one or more of the storage media 160 can be the memory device 130.

Figure 2A:
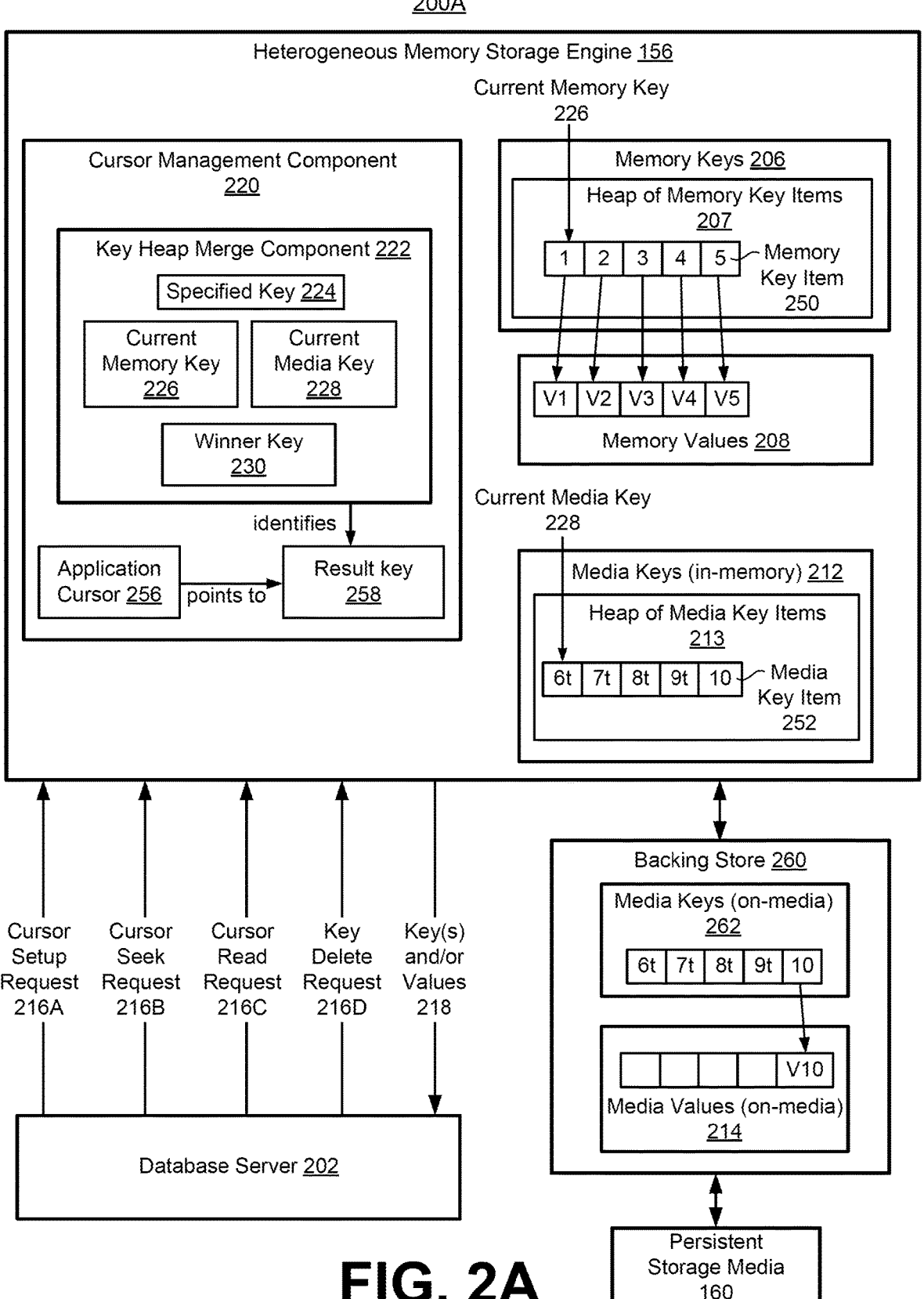
FIG. 2A illustrates an example heterogeneous memory storage engine in accordance with some embodiments.

FIG. 2A illustrates an example heterogeneous memory storage engine 156 in a computing environment 200A in accordance with some embodiments. The storage engine 156 can provide a key-value database, which can store information in the form of key-value pairs. The key-value database can include one or more key-value stores. Each key-value store can include one or more key-value pairs. The storage engine 156 can provide the key-value database to a database server 202.

The database server 202 can request operations 216 to be performed on the storage engine 156 and receive results 218 of the operations. The database server 202 can send a cursor setup request 216A, a cursor seek request 216B, a cursor read request 216C, and/or a key delete request 216D to the storage engine 156, for example. Each of the requests can include context information such as a key-value database identifier that identifies a particular key-value database and a key-value store identifier that identifies a particular key-value store in the particular key-value database, a transaction identifier that can be used to group multiple operations into a transaction, or other information for use by the storage engine 156. The cursor setup request 216A can request that a cursor setup operation be performed on a specified cursor. The specified cursor can be identified by a cursor identifier that identifies the cursor, for example. The cursor seek request 216B can request that a specified cursor be positioned at a specified key. The cursor seek request 216B thus causes the specified cursor to reference the specified key. The cursor read request 216C can request a value associated with a specified key or associated with a key referenced by a specified cursor.

The key delete request 216D can request that a key-value pair identified by a specified key, or by a key associated with a specified cursor, be deleted from a specified key-value store. The delete operation that can delete one or more values associated with one or more specified keys in a specified range. For example, a range delete operation can delete each key-value pair having a key in a specified range. The range delete operation can be implemented using a cursor. The range delete operation can iterate through the keys in the range, and for each key, perform a cursor seek operation with the key as a parameter. The cursor seek operation can determine whether the specified key exists in the key/value store. If the key exists, the range delete operation invokes an individual key delete operation on the specified key to delete the key/value pair identified by the specified key, and continue to the next key in the range until all keys in the range have been deleted.

The storage engine 156 can receive one or more of the requests 216 and perform the respective operations specified by the respective requests 216. To perform the respective operations, the storage engine 156 can store, read, update, and/or delete data in random-access memory 158 and/or storage media 160. The storage engine 156 can send results of performing the respective operations, such as respective key(s) and/or value(s) 218 or error status information, to the database server 202. The database server 202 can be an example of a storage application 154.

As an example, a key of 1 can be associated with the value "First data" to form a key-value pair (1, First Data), and a key of 2 can be associated with the value "Second data" to form a key-value pair (2, Second Data). The example key-value pairs described above can be stored in a key-value store using store operations (e.g., store(1, First Data) and store(2, Second Data)). A subsequent read operation that specifies a key of 1 (e.g., read(1)), can return "First Data") as a result, since the value "First Data" is associated with the key 1 in the KV store in this example. As another example, a query can accept a parameter that specifies a range of keys between a first specified key and a second specified key. The query can return the stored values that are associated with stored keys that are in the specified range.

The storage engine 156 can include a cursor management component 220, which can create, update, and access database cursors. As described above, a cursor can be or include a pointer that points to a particular key of a key-value pair. A cursor can be used to read a value associated with the key to which the cursor points. For example, a seek operation can be invoked to cause the cursor to point to a specified key. A read operation can then be invoked with the cursor as an input parameter. The read operation can retrieve a value associated with the key to which the cursor points. The pointer is also referred to herein as the cursor's "position."

A cursor can be "positioned" at a particular key by setting the cursor's pointer to point to (e.g., reference) the particular key.

A cursor can be re-positioned to point to different specified keys. For example, the cursor can then be positioned at a different key by invoking the seek operation with the different key as an input parameter, and a read operation can be invoked with the cursor as an input parameter to retrieve a value associated with the different key.

If the specified key is not present in the KV store, then the seek operation can cause the specified cursor to point to a next key that is lexicographically equal to or greater than the specified key. If the specified key is not present, the next key can be a key that is closest to the specified key, for example. Alternatively, the cursor can use reverse ordering, in which case the seek operation can cause the cursor to point to a next key that is lexicographically equal to or less than the specified key.

A cursor can include (or be associated with) state information that the KV store can use to efficiently access the key-value pair subsequent to a seek operation that positions the cursor at the key of the key-value pair. The cursor can also be used to efficiently access subsequent key-value pairs in the KV store in order of their keys (e.g., according to lexicographic order). "Iterating" herein shall refer to performing a sequence of seek operations, each of which accesses a different key. For example, iterating through the keys of a data store can involve accessing the keys in lexicographic order. Iterating can also involve performing a read operation to retrieve the value associated with each key. A cursor can be used to iterate over keys in a KV store in lexicographic order of the keys, and to read the respective values associated with the keys from the KV store. Lexicographic order can be, for example alphabetical order, numerical order, or other ordering that can be used to compare keys and determine whether a first key is less than, equal to, or greater than a second key.

For example, if a KV store contains the KV pairs (1, First Data) and (2, Second Data), a cursor can be used to iterate through the keys by performing the following sequence of program code operations, which perform a seek operation with a key of 1 as a parameter to update the cursor position so that the cursor is positioned at the key of 1, read the (key, value) pair at the updated cursor position, perform a seek operation with a key of 2 as a parameter to update the cursor position so that the cursor is positioned at the key of 2, and read the (key, value) pair at the updated cursor location.

```
Cursor.seek(1)
key1, value1=cursor.read( )
cursor.seek(2)
key2, value2=cursor.read( )
```

As a result of performing the above operations, the variable key1 is 1, the variable value1 is "First Data", the variable key2 is 2, and the variable value2 is "Second Data".

The storage engine 156 can use a backing store 260 to store at least a subset of the key-value pairs on persistent storage media 160. The storage engine 156 can access the storage media 160 via a backing store 260. The backing store 260 can store key-value pairs persistently on storage media 160, retrieve values associated with respective specified keys from storage media 160, and can perform other operations such as deleting key-value pairs. The backing store 260 can be, e.g., a SQL (Structured Query Language) database, a No-SQL data store (e.g., a data store that does not use specific schemas for data), or other suitable data store. The backing store 260 can translate commands that store, read, update, and delete key-value pairs to and from commands compatible with the storage media 160, such as NVMe or PCIe commands.

Each key-value pair in the data store can be stored in memory or on media. As an example, the key-value database can determine whether to store a particular key-value in volatile memory or non-volatile memory based on factors such as the time since the key-value pair was created (also referred to herein as the age of the key-value pair), the amount of available volatile memory, and the number of key-value pairs in the key-value pair database.

Each key can be represented by a data structure referred to herein as a "key item." Each key item can include a key identifier, which can be a string of numeric, alphabetic, and/or other characters. Each key item can also include a reference to the value associated with the key, so that a key item can be used to retrieve the value. Each key item can further include an indication of whether the key item is a tombstone key item (e.g., the key item represents a key that is designated as being deleted). The key items can be stored in a data structure such as the heap data structure described above, or other suitable data structure that provides efficient storage and retrieval of key items, including retrieval of key items according to an ordering relation associated with the key items' identifiers. The data structure does not necessarily store the key items in sorted order, but can provide retrieval of items in accordance with the order. For example, the heap data structure provides an efficient operation that retrieves and deletes the key item having the smallest key identifier from the heap. The heap data structure can provide efficient access to the key item having the smallest key.

The storage engine 156 can divide the set of key-value pairs into a memory-resident subset shown as a sequence of memory keys 206 and associated memory-resident values 208 and a media-resident subset shown as a sequence of media keys (on media) 262 and associated media values (on media) 214. The memory-resident subset can include recently added key-value pairs, and the media-resident subset can include older key-value pairs, for example.

Each sequence of keys 206, 262 can be stored in a respective heap (or other data structure). The keys can be stored in respective key items in the heap. Each key item can include a key identifier that represents the respective key itself and other information as described above. The keys in a sequence are not necessarily in a sorted order in memory, but a retrieval operation can provide keys from the sequence in sorted order. Since there are two different sequences of keys 206, 262, operations that access particular keys, such as a cursor seek operation, can search both sequences of keys 206, 262 for a specified key.

The sequences of keys 206, 262 can contain tombstone key items ("tombstones") that have respective key identifiers but do not represent valid key-value pairs. A tombstone key item can be designated as being deleted, but still exists in a sequence of key items. Each key item can include a deletion status indicator that has a particular value if deletion of the key item, or a key-value pair that includes the key item, has been requested, for example. A tombstone key item can retain the key identifier (e.g., numeric or alphabetic key) that was associated with the key item prior to the transition of the key item to a tombstone key item, and the tombstone key item can remain in the key sequence until, for example, garbage collection occurs.

The memory keys 206 can be stored as a heap of memory key items 207. The heap of memory key items 207 can be a min heap, which can efficiently access the smallest key item (e.g. the key item having the smallest key identifier).

The min heap can efficiently provide iteration from smaller to larger keys (e.g., forward iteration). In another example, the heap of memory key items 207 can be a max heap, which can efficiently access the largest key item (e.g. the key item having the largest key identifier). The max heap can efficiently provide iteration from higher to lower keys (e.g., reverse iteration). In still another example, the heap of memory key items 207 can be a min/max heap, which can efficiently access the smallest key item and the largest key item. The min/max heap can efficiently provide iteration in either direction. Each memory key item 250 in the heap of memory key items 207 can have an associated key identifier (also referred to herein as a "key"). Further, each memory key item 250 can be associated with a value in memory-resident values 208. The heap of memory key items 207 can be converted to or from a sequence of memory key items. For example, the smallest key item can be retrieved and removed from the heap of memory key items 207 repeatedly to generate a sequence of memory key items ordered from the smallest key item in the heap to the largest key item in the heap. A sequence of memory key items can be converted to the heap of memory key items 207 by performing a heap insert operation for each key item in the sequence. The sequence of memory key items 250 in the heap 207 is shown in sorted order as "1 2 3 4 5" for explanatory purposes. The sequence of memory key items 250 thus contains five key items having key identifiers 1, 2, 3, 4, and 5 in the illustrated example. Each of the memory key items 250 is associated with a respective one of the memory values 208. The memory values 208 associated with the memory key items 250 are thus V1, V2, V3, V4, and V5, respectively.

The media keys (on media) 262 can be stored on persistent media as a heap, sequence, or other suitable data structure. Further, each of the media keys 262 can be associated with a respective one of the media values (on media) 214. The media keys 262 are shown in sorted order as "6t 7t 8t 9t 10" for explanatory purposes. The media keys 262 thus contain five key items having key identifiers 6, 7, 8, 9, and 10. The "t" suffix on identifiers 6, 7, 8, and 9 indicates that the respective key items are designated for deletion and are thus tombstone key items. The tombstone key items do not have associated media values 214 in this example. The valid (non-tombstone) key item "10" is associated with the value "10" and thus includes a reference to one of the media values 214 ("V10").

Since accessing persistent media can be substantially slower than accessing memory, the storage engine 156 can store a copy of at least a portion of the media-resident subset in memory. For example, copies of the media keys 262 of the media-resident subset can be stored in memory as media keys 212. Thus, for efficient access, the media keys (on media) 262 can be copied or replicated to memory, as shown by media keys 212. The media keys 212 are stored similarly to the memory keys 206 described above. The media keys 212 can be stored as a heap of media key items 213. The heap of media key items 213 can be a min heap. Each media key item 252 in the heap 213 can have an associated key identifier. A sequence of memory key items 252 in the heap 212 is shown in sorted order as "6t 7t 8t 9t 10" for explanatory purposes. The sequence of media key items 252 thus contains five key items having key identifiers 6, 7, 8, 9, 10 in the illustrated example. As described above, the "t" suffix on identifiers 6, 7, 8, and 9 indicates that the respective key items are designated for deletion and are thus tombstone key items. The storage engine 156 can access the media keys in either the media keys (in-memory) 212 or the media keys (on media) 262.

Since there are two different sequences of key items, operations that access particular keys, such as a cursor seek operation, can search both sequences of key items to identify a specified key item identifier. The cursor management component 220 can include a key heap merge component 222, which can identify a smallest key less than or equal to a target key 224 by searching both sequences of key items. The merge component 222 is described below. In some embodiments, the merge component 222 can perform the operations described with respect to the method of FIG. 3.

The merge component 222 can initially can search for a specified key 224 in both the sequence of memory keys 206 and the sequence of media keys (in-memory) 212, starting at the smallest key in each sequence that is greater than or equal to the specified key (regardless of whether the smallest key is a valid key or a tombstone key). A current memory key item 226 is initially set to the smallest key in the memory keys 206 that is greater than or equal to the specified key 224. Further, a current media key item 228 is initially set to the smallest key in the media keys 212 that is greater than or equal to the specified key 224.

The search then performs a merging operation based on the current memory key 226 and the current media key 228. The merging operation includes comparing the current memory key 226 to the current media key 228, selecting the current memory key 226 as a "winner" key 252 if the current memory key 226 is less than or equal to the current media key 228, or selecting the current media key 228 as the winner key 230 if the current media key 228 is less than the current memory key 226, and advancing to the next key in the sequence that contains the winner key 230. That is, if the current memory key 226 is the winner key 230, then the current memory key 226 is set to the next larger key in the memory keys 206. Otherwise, the current media key 228 is the winner key, and the current memory key 226 is set to the next larger key in the media keys 212. If the winner key is a tombstone, the merging operation is then repeated. If the winner key is not a tombstone, then the winner key is the result of the search, referred to herein as a result key 258. The result key 258 is the smallest of the keys in the memory and media sequences 206, 212 that is equal to or greater than the specified key 224 for which the search was performed. If the result key 258 is greater than the specified key 224, then the specified key 224 does not exist in the key-value database. In other cases, e.g., the sequences 206, 212 do not contain a valid (non-tombstone) key greater than or equal to the specified key 224, the result of the search can indicate that no key was found. If the result key 258 matches the specified key 224, or the result key 258 does not match the specified key 224 but is acceptable to the application (e.g., a client application or storage engine component) that invoked the search, then the result key 258 can be used to perform a database operation. An application cursor 256 can be set to point to the result key data item 258.

FIG. 2B illustrates an example cursor setup operation 200B that advances a media key pointer past one or more tombstone media keys. The example cursor setup operation is invoked for a particular cursor and determines an initial position for the cursor. The initial position can be represented as pointer to either a key in the sequence of memory keys 206 or a key in the sequence media keys 212, depending on which sequence contains the smallest valid (non-tombstone) key in the two sequences. To identify the smallest valid key in two sequences 206, 212, the cursor setup operation reads a key from each sequence and compares the two keys (a memory key and a media key) to determine which is smaller. The cursor setup operation sets the cursor to point to the smallest valid key found in the two sequences.

To identify the smallest valid key in the sequence of memory keys 206, the cursor setup operation identifies the smallest memory key from the sequence of memory keys 206 ("1", pointed to a memory key pointer) and determines whether the smallest memory key is valid. In this example, the key "1" is valid (because it does not have a "t" suffix).

Since the media keys 212 can contain tombstones, the cursor setup operation used in the example of FIG. 2B advances a media key pointer past tombstone media keys when determining the initial cursor position. Accordingly, prior to identifying the smallest valid key in the sequence of media keys 212, the cursor setup operation advances the media key pointer to each of the consecutive tombstone keys ("6t 7t 8t 8t") and stops advancing the media key pointer when the valid (non-tombstone) key "10" is reached. Since "10" is the first valid media key reached by iterating through the media keys 212, it is the smallest valid media key. The cursor setup operation then compares the smallest valid memory key ("1") to the smallest valid media key ("10"). Since the smallest valid memory key ("1") is smaller, the resulting initial cursor position is "1" in the memory keys 206, and the cursor setup operation sets the cursor to point to the memory key "1".

However, advancing the media key pointer past the tombstone media key "6t" is not necessary. Since accessing the media keys 212 (e.g., using min heap operations) causes the media keys to be presented in sorted order as shown (6t 7t 8t 9t 10). Thus, there are no possible valid (non-tombstone) media keys smaller than 6 after the "6t" in the sequence of media keys 212. In other examples, there can be many consecutive tombstone keys, and advancing the media key pointer past all of the consecutive tombstone keys can cause substantial delays in cursor setup operations (and other operations that use cursors).

FIG. 2C illustrates an example cursor setup operation 200C that again advances a media key pointer past one or more tombstone media keys without comparing the tombstone media keys to a memory key. The example of FIG. 2C is similar to that of FIG. 2B, but the memory key "1" has been deleted and is shown as a tombstone key "1t" in FIG. 2C. Subsequent to the deletion of memory key "1", use of the cursor described above (with reference to FIG. 2B) can cause the cursor setup operation to be invoked again for the cursor. The cursor setup operation again identifies the smallest valid key in two sequences 206, 212 as described above. Since memory key "1" has changed to a tombstone "1t", the cursor setup operation advances the memory key pointer to the next memory key, which is "2". Since memory key "2" is not a tombstone, the cursor setup operation determines that the smallest valid memory key is "2". Further, the cursor setup operation again advances the media key pointer to each of the consecutive tombstone keys and stops when the valid key "10" is reached. Again, advancing the media key pointer past the tombstone media key "6t" is not necessary, and repeatedly advancing the media key pointer past all of the consecutive tombstone keys can cause further substantial delays in cursor setup operations and other operations that use cursors.

FIGS. 2D and 2E illustrate example cursor setup operations 200E, 200E that compare each tombstone media key to a memory key prior to advancing the cursor past the tombstone media key in accordance with some embodiments. The example cursor setup operations in FIGS. 2D and 2E each determine an initial position for a cursor by identifying the smallest valid key in the two sequences 206, 212. To identify the smallest valid key, the example cursor setup operations in FIGS. 2D and 2E can use the key heap merge component 222 described above with respect to FIG. 2A (and which can perform the operations described below with reference to the method of FIG. 3) with a specified key input parameter 224 of a minimum possible key value, such as "0". Thus, the key heap merge component 222 (or the method 300) identifies the smallest valid key greater than or equal to 0 in the two sequences 206, 212.

The cursor setup operation 200D of FIG. 2D can thus invoke the key heap merge component 222 to determine an initial position for the cursor. The merge component 222 can initially find the smallest key (valid or tombstone) greater than or equal to 0 in each of the sequences 206, 212. The merge component 222 sets a current memory key 226 to the smallest memory key greater than or equal to 0, which is "1". Further, the merge component 222 sets a current media key 228 to the smallest media key greater than or equal to 0, regardless of whether the media key is a tombstone. Thus, the current media key 228 is set to "6" ("6t" without the "t", which is an explanatory notation indicating that the key is a tombstone). The merge component 222 then compares the current media key 228 to the current memory key 226 to determine which of the keys is smaller (e.g., which is the winner key 230).

In the example of FIG. 2D, the smallest key is "1" (because 1 is less than 6). The merge component 222 then determines whether the smallest key is a tombstone key. The merge component 222 determines that the smallest key "1" is not a tombstone, and is therefore valid. Thus, the merge component 222 identifies "1" as the smallest valid key in the sequences 206, 212. The cursor setup operation can set the cursor to point to the memory key "1". The merge component 222 has not advanced the current media key 228 past the first tombstone 6t in the media keys 212. Accordingly, the cursor setup operation does not advance the current media key 228 past all of the consecutive tombstone keys, and does not cause a substantial delay in cursor setup operations.

As another example, the cursor setup operation 200E of FIG. 2E, which is performed after the memory key "6" has been deleted, also does not advance the current media key 228 past the media key "6t" when determining the smallest valid key in the sequences 206, 212. The cursor setup operation 200E can use the merge component 222 as described above to determine that the smallest valid key in the sequences 206, 212 is "2". Accordingly, the cursor setup operation 200E can set the cursor to point to the memory key "2" without advancing the current media key 228 past the sequence of consecutive tombstones in the media keys 212.

FIG. 2F illustrates an example cursor seek operation 200F that seeks to a specified key identifier that is present in both a sequence of memory keys and a sequence of media keys in accordance with some embodiments. The cursor seek operation 200F is invoked with a specified key parameter "6" in this example. The cursor seek operation 200F can invoke the merge component 222 to identify a key item in the sequence of memory keys 206 or the memory-resident values 208 that corresponds to the key "6" (e.g., includes the key identifier "6"). The merge component 222 can initially find the smallest key (valid or tombstone) greater than or equal to the specified key "6" in each of the sequences 206, 212. The merge component 222 sets a current memory key 226 to the smallest memory key greater than or equal to 6, which is "6". Further, the merge component 222 sets a current media key 228 to the smallest media key greater than or equal to 6, regardless of whether the media key is a tombstone. Thus, the current media key 228 is set to "6" ("6t" without the "t"). The merge component 222 then compares the current media key 228 to the current memory key 226 to determine which of the keys is smaller (e.g., which is the winner key 230).

In the example of FIG. 2F, the smallest key is "6" (both keys are 6). The memory keys 206 take precedence over the media keys 212 because any of the memory keys 206 is newer than any of the media keys 212 (as a result of older memory keys 206 being moved to media keys 212). The merge component 222 then determines whether the smallest key is a tombstone key. The merge component 222 determines that the smallest key "1" is not a tombstone, and is therefore valid. Thus, the merge component 222 identifies the memory key "6" as the smallest valid key in the sequences 206, 212. The cursor setup operation can set the cursor to point to the memory key "6". The merge component 222 has not advanced the current media key 228 past the first tombstone 6t in the media keys 212. Accordingly, the cursor setup operation does not advance the current media key 228 past all of the consecutive tombstone keys, and does not cause a substantial delay in cursor setup operations.

FIG. 2G illustrates an example cursor seek operation 200G that seeks to a specified key identifier that is present in a sequence of media keys in accordance with some embodiments. In FIG. 2G, the example cursor seek operation 200G is invoked with a specified key "8". The cursor seek operation can invoke the merge component 222 to identify a key item in the sequence of memory keys 206 or the memory-resident values 208 that corresponds to the specified key "8" (e.g., includes the key identifier "8"). The merge component 222 can initially find the smallest key (valid or tombstone) greater than or equal to the specified key "8" in each of the sequences 206, 212. The merge component 222 attempts to set a current memory key 226 to the smallest memory key greater than or equal to 8. Since the memory keys 206 do not contain a key equal to 8, the current memory key 226 there is no current memory key 226 to use in a comparison in this example.

Further, the merge component 222 sets a current media key 228 to the smallest media key greater than or equal to 8, regardless of whether the media key is a tombstone. Thus, the current media key 228 is set to "8" ("8t" without the "t"). The merge component 222 then determines that the current media key 228 ("8") is a tombstone. Since the current media key 228 is a tombstone, the merge component 222 advances the current media key 228 to the next key in the sequence of media keys 212, which is "9" ("9t" without the "t"). Again, since the new current media key 228 ("9") is a tombstone, the merge component 222 advances the current media key 228 to the next key in the sequence of media keys 212, which is "10". Since "10" is a valid (non-tombstone) key, the merge component 222 identifies the media key "10" as the smallest valid key in the sequences 206, 212. The merge component 222 then provides the media key "10" as a result key 258 returned from the seek operation. An application cursor 256 can be set to point to the result key data item 258.

FIG. 3 is a flow diagram of an example method 300 to perform a seek operation based on a specified key identifier in a key-value store in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the storage engine 156 or a component thereof, such as the merge component 222 of FIG. 2A. The storage engine 156 can be located on the host system 120 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic can receive a request to perform a seek operation based on a specified key for a specified cursor. For example, the seek operation can attempt to position the specified cursor at the specified key. At operation 304, the processing logic can set a current memory key to reference a smallest memory key (in a sequence of memory keys) that is greater than or equal to the specified key, and can also set a current media key to reference a smallest media key (in a sequence of media keys) that is greater than or equal to the specified key.

At operation 306, the processing logic can determine whether the end of the sequence of media keys has been reached or the current memory key is less than or equal to the current media key. If so, then the processing logic can perform operation 308. Otherwise, the processing logic can perform operation 312. At operation 308, the processing logic can set a variable named "winner key" to reference the current memory key.

At operation 310, the processing logic can advance to the next memory key in the sequence of memory keys by setting the current memory key to reference the next memory key (in the sequence of memory keys) that is greater than the current memory key. Subsequent to operation 310, the processing logic can perform operation 318, which is described below.

At operation 312, the processing logic can determine whether the end of the sequence of memory keys has been reached or the current media key is less than or equal to the current memory key. If so, then the processing logic can perform operation 314. Otherwise, the processing logic can perform operation 320. At operation 320, the processing logic can return an error or other result indicating that the specified key was not found in the index.

At operation 314, the processing logic can set the winner key to reference the current media key. At operation 316, the processing logic can set the current media key to reference the next media key (in the sequence of media keys) that is greater than the current media key. Subsequent to operation 316, the processing logic can perform operation 318.

At operation 318, the processing logic can determine whether the winner key is a tombstone key. If so, the processing logic can continue at operation 306. Otherwise, if at operation 318 the processing logic determines that the winner key is not a tombstone key, then the winner key is a valid key item, and the processor can perform operation 322. At operation 322, the processor can set the specified cursor to point to the winner key.

FIG. 4 is a flow diagram of an example method 400 to identify a target key based on a specified key and perform a database operation using the identified target key in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the storage engine 156 of FIG. 2A. The storage engine 156 can be located on the host system 120 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic can receive a request to identify a target key in a key-value store based on a specified key. At operation 404, the processing logic can identify, in at least one of a plurality of sequences of memory keys, the target key based on the specified key, wherein the plurality of sequences of memory keys includes a sequence of memory keys and a sequence of media keys that comprises one or more designated media keys. Each of the one or more designated media keys is designated as being deleted. The identifying comprises comparing each of the one or more designated media keys to the specified key.

The identifying can further comprise comparing each of the one or more designated media keys to at least one of the memory keys. The identifying can further comprise comparing one of the memory keys to one of the one or more media keys, determining that the one of the memory keys is less than or equal to the one of the designated media keys, and, responsive to determining that the one of the memory keys is designated as being deleted, performing a subsequent comparison between the one of the media keys and a next one of the memory keys that consecutively follows the one of the designated memory keys in the sequence of memory keys according to a key ordering relation.

The comparing of each of the one or more designated media keys to the specified key can be performed by a search for a media key having a smallest key that is greater than or equal to the specified key in the sequence of media keys. The identified target key can include a target key and can reference a data value. The database operation can include accessing the data value referenced by the target key. The sequence of memory keys can include one or more keys stored in random-access memory, and wherein the sequence of media keys can include one or more keys stored in persistent storage media. The one or more designated media keys can be consecutive in the sequence of media keys according to a key ordering relation, and the comparing comprises comparing each of the designated media keys to at least one of the memory keys according to the key ordering relation. At operation 406, the processing logic can perform a database operation using the target key.

Figure 5:
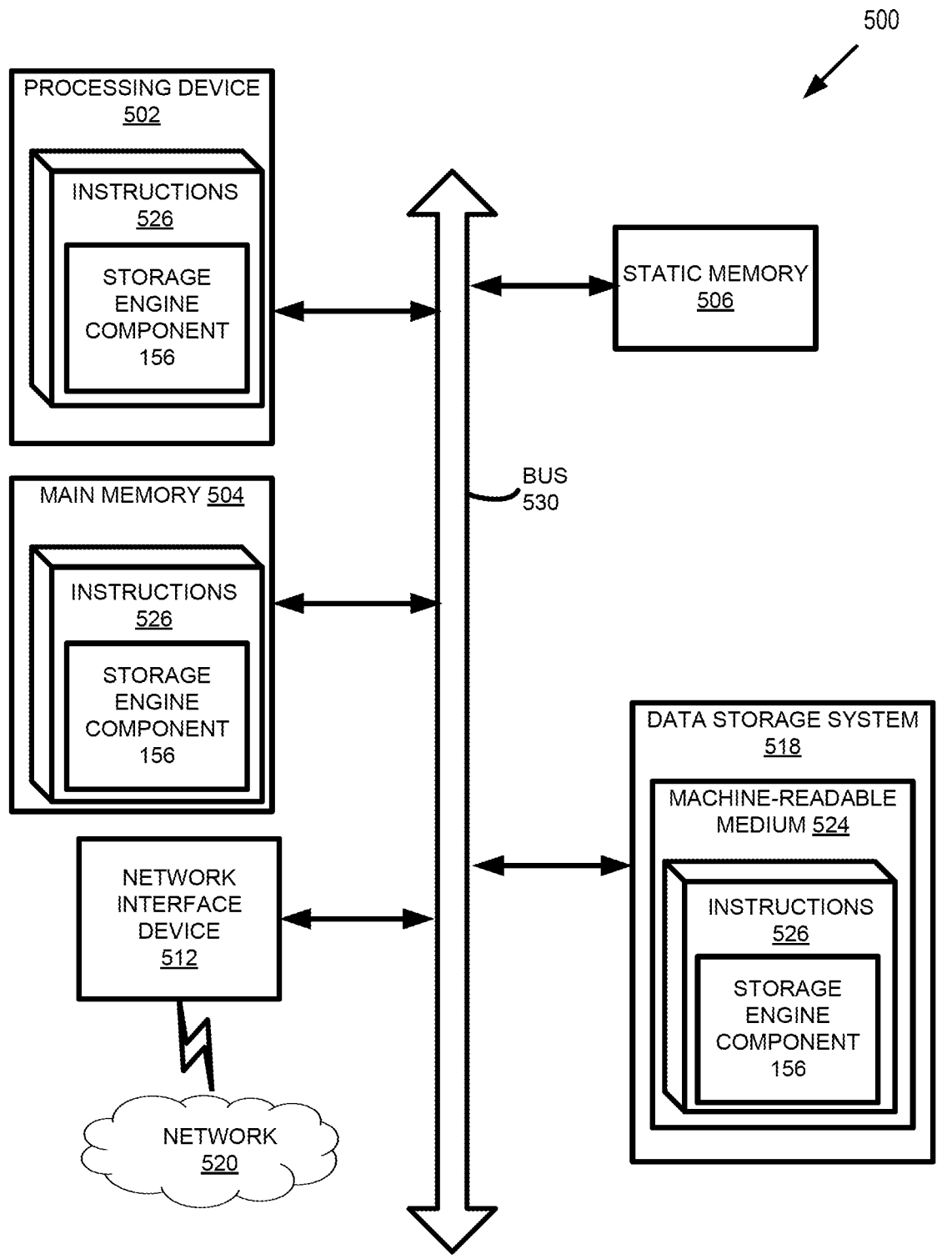
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to a storage engine 156 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1A.

In one embodiment, the instructions 526 include instructions to implement functionality corresponding to a storage engine component (e.g., the storage engine 156 of FIG. 2A). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled to the memory device, the processing device to:

receive a request to identify, in a key-value store, a target key based on a specified key;

identify a first sequence of key-value pairs associated with the key-value store, wherein the first sequence comprises most recently used key-value pairs;

identify a second sequence of key-value pairs associated with the key-value store, wherein the second sequence comprises remaining key-value pairs of the key-value store;

identify, among a first key of the first sequence of the most recently used key-value pairs and a second key of the second sequence of the remaining key-value pairs, a smallest key that is equal or greater than the specified key;

advance to a next key in a sequence of key-value pairs that contains the identified smallest key;

responsive to determining that the next key does not identify a deleted key-value pair, designate the next key as the target key; and perform a database operation using the target key.

2. The system of claim 1, wherein the first sequence of key-value pairs includes one or more keys stored in a random-access memory, and wherein the second sequence of key-value pairs includes one or more keys stored in a persistent storage.

3. The system of claim 1, wherein the database operation comprises accessing a data value referenced by the target key.

4. The system of claim 1, wherein the request to identify the target key is associated with a database cursor, and performing the database operation comprises positioning the database cursor at the target key.

5. The system of claim 1, wherein the first sequence of key-value pairs is associated with a heap data structure that identifies a smallest key in the first sequence.

6. A method comprising:

receiving, by a processing device, a request to identify, in a key-value store, a target key based on a specified key;

identifying a first sequence of key-value pairs associated with the key-value store, wherein the first sequence comprises most recently used key-value pairs;

identifying a second sequence of key-value pairs associated with the key-value store, wherein the second sequence comprises remaining key-value pairs of the key-value store;

identifying, among a first key of the first sequence of the most recently used key-value pairs and a second key of the second sequence of the remaining key-value pairs, a smallest key that is equal or greater than the specified key;

advancing to a next key in a sequence of key-value pairs that contains the identified smallest key;

responsive to determining that the next key does not identify a deleted key-value pair, designating the next key as the target key; and performing a database operation using the target key.

7. The method of claim 6, wherein the first sequence of key-value pairs includes one or more keys stored in a random-access memory, and wherein the second sequence of key-value pairs includes one or more keys stored in a persistent storage.

8. The method of claim 6, wherein the database operation comprises accessing a data value referenced by the target key.

9. The method of claim 6, wherein the request to identify the target key is associated with a database cursor, and performing the database operation comprises positioning the database cursor at the target key.

10. A non-transitory machine-readable storage medium storing instructions that, when executed by a processing device, cause the processing device to perform operations comprising:

receiving, by a computing device, a request to identify, in a key-value store, a target key based on a specified key;

identifying a first sequence of key-value pairs associated with the key-value store, wherein the first sequence comprises most recently used key-value pairs;

identifying a second sequence of key-value pairs associated with the key-value store, wherein the second sequence comprises remaining key-value pairs of the key-value store;

identifying, among a first key of the first sequence of the most recently used key-value pairs and a second key of the second sequence of the remaining key-value pairs, a smallest key that is equal or greater than the specified key;

advancing to a next key in a sequence of key-value pairs that contains the identified smallest key;

responsive to determining that the next key does not identify a deleted key-value pair, designating the next key as the target key; and performing a database operation using the target key.

11. The non-transitory machine-readable storage medium of claim 10, wherein the first sequence of key-value pairs includes one or more keys stored in a random-access memory, and wherein the second sequence of key-value pairs includes one or more keys stored in a persistent storage.

12. The non-transitory machine-readable storage medium of claim 10, wherein the database operation comprises accessing a data value referenced by the target key.

13. The non-transitory machine-readable storage medium of claim 10, wherein the request to identify the target key is associated with a database cursor, and performing the database operation comprises positioning the database cursor at the target key.

14. The system of claim 1, wherein the processing device is further to:

responsive to determining that the next key does not identify a deleted key-value pair, identify, by comparing a third key of the first sequence of key-value pairs and the second key of the second sequence of key-value pairs, a smallest key that is equal or greater than the specified key; and advance to a next key in a sequence of key-value pairs that contains the identified smallest key.

15. The method of claim 6, further comprising:

responsive to determining that the next key does not identify a deleted key-value pair, identifying, by comparing a third key of the first sequence of key-value pairs and the second key of the second sequence of key-value pairs, a smallest key that is equal or greater than the specified key; and advancing to a next key in a sequence of key-value pairs that contains the identified smallest key.

16. The method of claim 6, wherein the first sequence of key-value pairs is associated with a heap data structure that identifies a smallest key in the first sequence.

17. The non-transitory machine-readable storage medium of claim 10, wherein the operations further comprise:

responsive to determining that the next key does not identify a deleted key-value pair, identify, by comparing a third key of the first sequence of key-value pairs and the second key of the second sequence of key-value pairs, a smallest key that is equal or greater than the specified key; and advance to a next key in a sequence of key-value pairs that contains the identified smallest key.

* * * * *